United States Patent [19]

Oertle

[11] Patent Number: 5,358,350
[45] Date of Patent: Oct. 25, 1994

[54] CONNECTION DEVICE FOR A STEERING COLUMN OF A MOTOR VEHICLE

[75] Inventor: Max Oertle, Mauren, Liechtenstein

[73] Assignee: Etablissement Supervis, Vaduz, Liechtenstein

[21] Appl. No.: 11,962

[22] Filed: Feb. 1, 1993

[30] Foreign Application Priority Data

Jan. 31, 1992 [DE] Fed. Rep. of Germany ....... 4202684

[51] Int. Cl.$^5$ ................................................ F16B 1/00
[52] U.S. Cl. ..................................... 403/12; 403/290; 403/373
[58] Field of Search .................... 403/57, 58, 157, 159, 403/74, 314, 383, 12, 290, 373; 464/134, 135; 72/379.2; 279/84; 411/437, 516, 522, 523, 527

[56] References Cited

U.S. PATENT DOCUMENTS

| 2,288,710 | 7/1942 | Hotchkin | 411/527 |
|---|---|---|---|
| 2,560,518 | 7/1951 | Amesbury | 411/523 |
| 3,221,533 | 12/1965 | Buys | 72/379.2 |
| 3,612,582 | 10/1971 | Pitner | 403/314 |
| 4,012,155 | 3/1977 | Morris . | |
| 4,507,007 | 3/1985 | Mallet | 403/157 |
| 4,646,552 | 3/1987 | Kanbe | 72/379.2 |
| 5,018,899 | 5/1991 | Kuribara | 403/157 |
| 5,090,833 | 2/1992 | Oertle et al. . | |
| 5,188,474 | 3/1993 | Ohkubo et al. | 403/157 |

FOREIGN PATENT DOCUMENTS

| 0292442A1 | 11/1988 | European Pat. Off. . | |
| 0300854A1 | 1/1989 | European Pat. Off. . | |
| 0319149A2 | 6/1989 | European Pat. Off. . | |
| 0323298A1 | 7/1989 | European Pat. Off. . | |
| 0445591A1 | 9/1991 | European Pat. Off. . | |
| 3226981A1 | 1/1984 | Fed. Rep. of Germany . | |
| 952386 | 11/1949 | France | 72/379.2 |
| 2620997A1 | 3/1989 | France . | |
| 2624083A1 | 6/1989 | France . | |

Primary Examiner—Randolph A. Reese
Assistant Examiner—Anthony Knight
Attorney, Agent, or Firm—Friedrich Kueffner

[57] ABSTRACT

A device for connecting a steering column of a motor vehicle to a shaft journal of a steering mechanism. The device includes a U-shaped coupling member which is hinged to the steering column so as to be swingable about a transverse axis. The U-shaped coupling member has side walls which are provided with bores for receiving a tightening screw which is secured against rotation. A nut is mounted on the tightening screw. An auxiliary sheet metal piece is mounted on the inner side of a side wall of the coupling member. The auxiliary piece has a cutout which is in alignment with the bore in the side wall. The rim of the cutout has lugs which project into the bore of the side wall. Tongues are provided on both sides of the cutout. The tongues project toward the center plane of the U-shaped coupling member and toward the web of the coupling member connecting the side walls. When the shaft journal is placed in the coupling member, the front edges of the tongues rest against the shaft journal and prevent removal of the shaft journal.

10 Claims, 2 Drawing Sheets

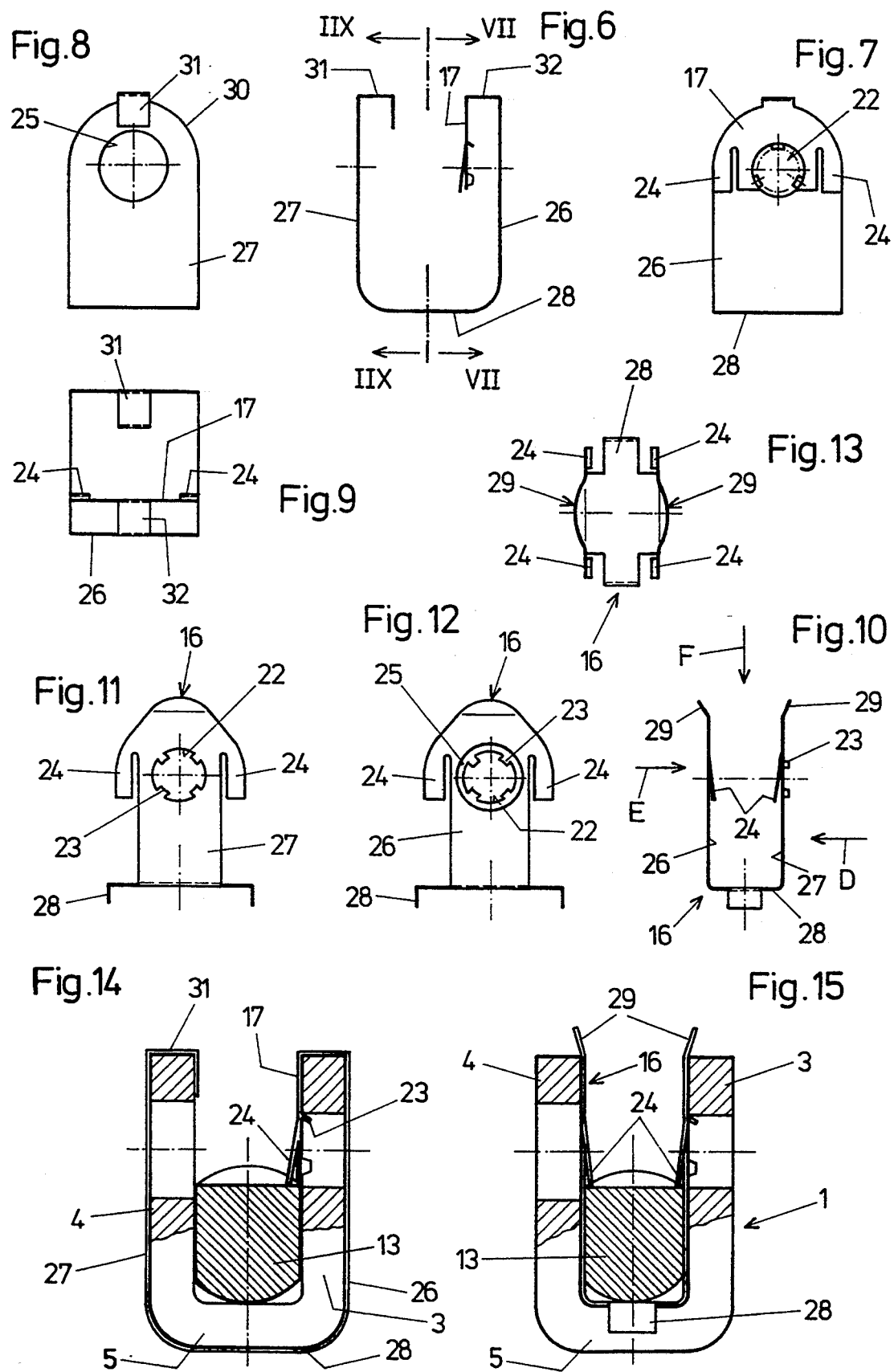

CONNECTION DEVICE FOR A STEERING COLUMN OF A MOTOR VEHICLE

BACKGROUND OF THE INVENTION

1. Field of the Invention.

The present invention relates to a device for connecting a steering column of a motor vehicle to a shaft journal of a steering mechanism. The device includes a coupling member which is U-shaped in cross section and is connected to the steering column so as to be swingable about a transverse axis. The side walls of the U-shaped coupling member have bores which are in alignment with each other for receiving a tightening screw which is secured against rotation and which can be fixed by means of a nut.

2. Description of the Related Art

Devices of the above-described type are described and illustrated in the following prior art publications: EP-OS 323 298, FR-OS 2620 997, EP-OS 292 442, EP-OS 319 149, EPOS 300 854, DE-OS 3226 981, US-PS 4012 155, and EP-OS 445 591. In this connection, the constructions in accordance with European publications 323 298 and 445 591 are of particular interest, because they are designed in such a way that the devices can be assembled with one hand. The space available in the engine compartment of a motor vehicle is frequently so small that the components to be connected can only be manipulated with one hand. The above-mentioned constructions have been developed for this type of assembly and are suitable for this purpose. However, the devices described in these publications are relatively complicated.

In addition, in order to be complete, French Patent 2 624 083 should be mentioned, which shows an auxiliary assembly piece of sheet metal for use in a device of the above-described type. The auxiliary assembly piece has the purpose of ensuring that the tightening screw can only be inserted into the U-shaped coupling member when the shaft journal of the steering mechanism has assumed its actual position in the coupling member required for assembly. The auxiliary assembly piece is punched from sheet metal and is then bent. The auxiliary assembly piece has a ring-shaped portion which is secured at the end face to the sides of the coupling member by means of sheet metal lugs. Connected to the ring-shaped portion is another lug which extends parallel to the ring-shaped portion and is formed in one piece with the ring-shaped portion. Upwardly bent flaps are formed on the side edges of the lug. When the auxiliary assembly piece is secured to the end face of the U-shaped coupling member, the above-mentioned two flaps are located between the two side walls of the coupling member which have throughbores for the tightening screws and, as a result, the flaps cover and close the throughbores, so that initially the tightening screw cannot be inserted. When the shaft journal of the steering mechanism is slid in, the lug with the flaps is bent outwardly by the end face of the shaft journal as the shaft journal is slid in and, once the shaft journal has been inserted to such an extent that its annular groove is in alignment with the throughbores, the lug with the flaps is bent outwardly to a sufficient extent to make it possible that the tightening screw can now be inserted. On the other hand, if the shaft journal is not inserted to the extent necessary, the lug with the flaps is not sufficiently swung outwardly and the flaps still at least partially lock the throughbores for the tightening screw, so that the tightening screw cannot be inserted at that stage.

SUMMARY OF THE INVENTION

Therefore, it is the object of the present invention to structurally simplify and improve a device of the above-described type, while still making it possible to manipulate the device with a single hand, as described above.

In accordance with the present invention, an auxiliary sheet metal piece is placed against the inner surface of at least one of the side walls of the coupling member, The auxiliary piece has a cutout which is essentially congruent with the bore of the side wall. Lugs extending into the bore of the side wall are formed at the edge of the cutout. Tongues are punched out to the sides of the cutout. The tongues project toward the center plane of the U-shaped coupling member and toward the web of the coupling member connecting the side walls thereof. When the shaft journal is inserted into the coupling member, the front edges of the tongues bear against the shaft journal and prevent the shaft journal from sliding out.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING In the drawing:

FIG. 6 is a front elevational view of a second embodiment of the auxiliary sheet metal piece according to the present invention;

FIG. 7 is a sectional view taken along sectional line VII—VII of FIG. 6;

FIG. 8 is a sectional view taken along sectional line VIII—VIII of FIG. 6;

FIG. 9 is a top view of the auxiliary piece seen in direction of arrow C of FIG. 6;

FIG. 10 is a front view of a third embodiment of the auxiliary sheet metal piece according to the present invention;

FIG. 11 is a side view of the auxiliary piece seen in direction of arrow D of FIG. 10;

FIG. 12 is another side view of the auxiliary piece seen in direction of arrow E of FIG. 10;

FIG. 13 is a top view of the auxiliary piece seen in direction of arrow F of FIG. 10;

FIG. 14 is a front view of the coupling member with inserted shaft journal and with the auxiliary sheet metal piece according to FIGS. 6-9; and FIG. 15 is a front view of the coupling member with inserted shaft journal and the auxiliary sheet metal piece according to FIGS. 10-13.

DESCRIPTION OF THE PREFERRED EMBODIMENTS

Figure 1:
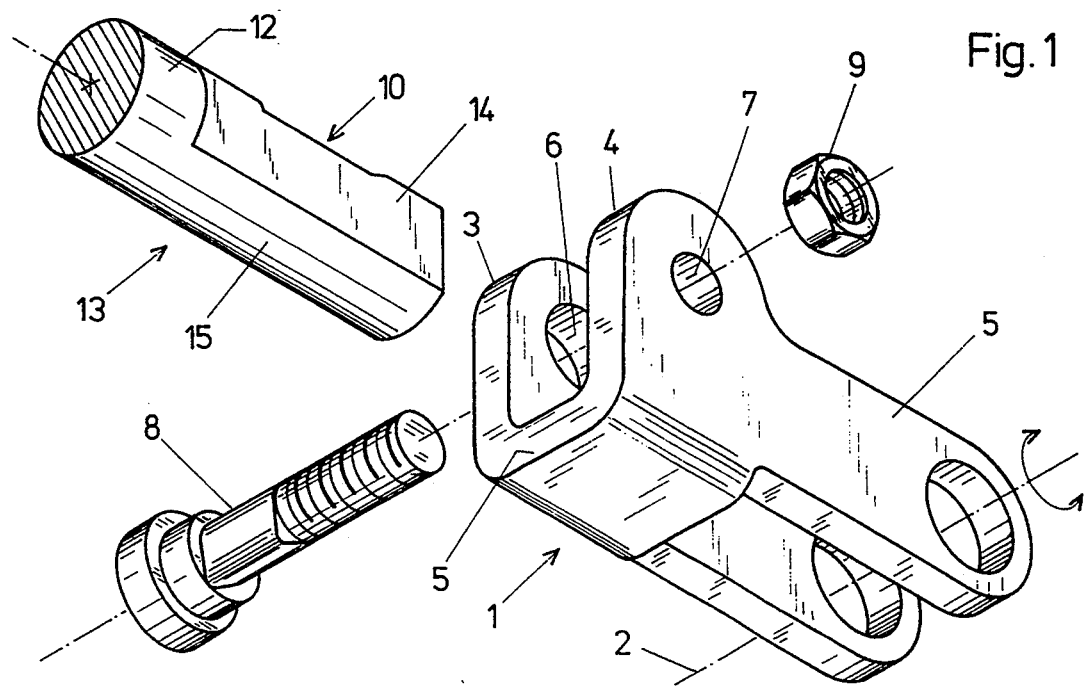
FIG. 1 is a perspective exploded view of the connection device according to the present invention without the auxiliary sheet metal piece.

FIG. 1 of the drawing shows in a perspective and exploded view the significant elements of the connection device of the above-discussed type. A coupling member 1, which can be swung about its transverse axis 2, is connected in an articulated manner to an end of a steering column or steering shaft, not shown. For example, the coupling member 1 is part of a universal joint. The coupling member 1 has a U-shaped cross section with side walls 3 and 4 and a web 5 connecting the side walls 3 and 4. Bores 6 and 7, which are in alignment with each other, are provided in the two side walls 3 and 4. The bores 6 and 7 serve to receive a tightening screw 8 with a head, a threaded portion, and a shaft portion which, in the illustrated embodiment, has a lens-shaped cross section. After the tensioning screw 8 has been properly inserted, a nut 9 is used for securing the tightening screw 8. As illustrated, the nut 9 is a component which is independent and separate from the coupling member 1. It is basically also possible to mount such a nut directly but rotatably on the outer side of the wall 3.

The coupling member 1 serves the purpose of receiving the portion 13 of a shaft journal 12 of a steering mechanism, not shown. As illustrated, the portion 13 of the shaft journal 12 is defined by three surfaces 14 which extend at an angle relative to each other and by a surface 15 which extends approximately corresponding to the shape of the web 5, wherein the surface opposite the surface 15 has an indentation 10 which, together with the tightening screw 8, serves as a mechanical securing means.

When the above-described components are arranged in a motor vehicle chassis in their positions ready for assembly, the shaft journal 12 assumes within the chassis a fixed position with respect to space. The same is true for the transverse axis 2 about which the coupling member 1 is swung downwardly. In order to connect these components, the coupling member 1 is swung upwardly about its transverse axis 2 until the portion 13 rests between the side walls 3 and 4 and against the web 5. Subsequently, the tightening screw 8 is passed through the bores 6 and 7, and the nut 9 is screwed onto the threaded portion of the screw and the nut is tightened. The cross-sectional shape of the shaft of the tightening screw 8 prevents rotation of the tightening screw 8 because the shaft, with its lens-shaped cross section, bears laterally against the surface of the portion 13 which is formed by the indentation 10.

All of the individual assembly steps described above must be carried out with only one hand.

For this purpose, according to the present invention, an auxiliary sheet metal piece is provided as an aid in assembling the connection.

Figure 4:
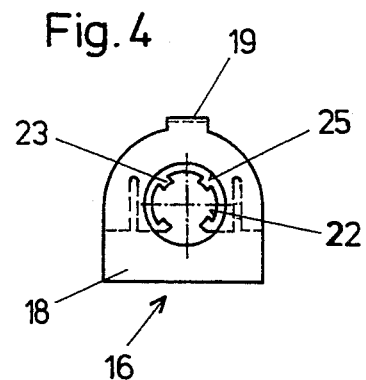
FIG. 4 is a rear view of the auxiliary piece seen in direction of arrow B in FIG. 3.
Figure 2:
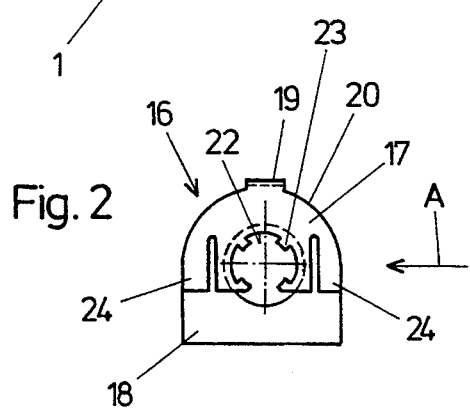
FIG. 2 is an elevational front view of a first embodiment of the auxiliary piece according to the present invention.
Figure 3:
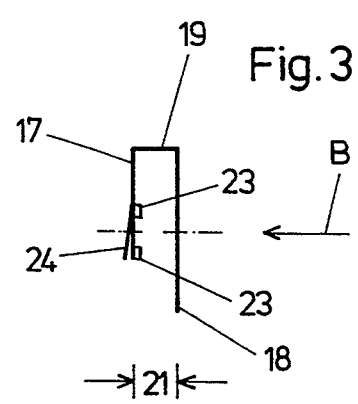
FIG. 3 is a side view of the auxiliary piece seen in direction of arrow A in FIG. 2.

FIGS. 2-4 of the drawing show a first embodiment of this auxiliary piece 16. This auxiliary piece 16 has a first part 17 and a second part 18 which extend essentially parallel to each other and are connected to each other by a narrow web 19 so that, as seen in FIG. 3 of the drawing, the auxiliary piece 16 has a U-shape. The upper contour 20 of the auxiliary piece 16, i.e., the shape of the edges of the two parts 17 and 18, corresponds approximately to the contour of one of the side walls 3, 4 of the coupling member 1. As can be seen in FIG. 3, the distance 21 between the two parts 17 and 18 corresponds to the wall thickness of the side walls of the coupling member 1.

As seen in FIG. 2, the upper part 17 of the auxiliary piece 16 has a cutout 22. Lugs 23 project rearwardly at an acute angle from the rim of the cutout 22. Tongues 24 are punched into the part 17 on both sides of the cutout 22. The tongues 24 are bent forwardly at an acute angle, as can be seen in FIG. 3. The rear part 18 is essentially plane and has a bore 25 which corresponds to and is in alignment with the cutout 22. The diameter of bore 25 may advantageously be slightly greater than the diameter of the cutout 22.

Figure 5:
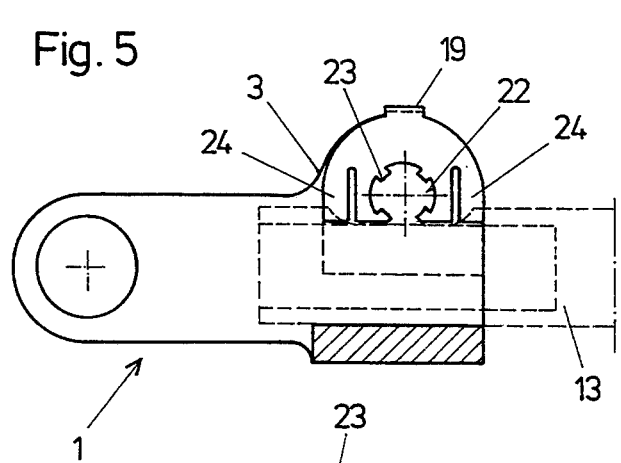
FIG. 5 is a longitudinal sectional view of the coupling member with the auxiliary piece of FIGS. 2-4 mounted on the coupling member.

The auxiliary piece 16, which is U-shaped as seen in the side view of FIG. 3 and serves as an aid in the assembly, is slid onto a side wall 3 of the coupling member 1, as illustrated in the sectional view of FIG. 5. The cutout 22 and the bore 25 are then in alignment with the bore 7 of the side wall 3, wherein the lugs 23 project into the bore 7 and at least some of these lugs include an acute angle with the wall of the bore.

By using this simple auxiliary piece 16, which is punched from a spring plate, the coupling member 1 can now be assembled using only one hand.

When the coupling member 1 is swung onto the portion 13 of the shaft journal 12, the portion 13 initially presses the resilient tongues 24 so that the tongues 24 are flat until the entire portion 13 passes the tongues 24 and, because of the elasticity of the tongues 24, the tongues 24 again project forwardly and now rest on the surface of the indentation 10 and prevent the coupling member from swinging down again. FIG. 3 of the drawing shows the swung-in portion 13 in broken lines. The tightening screw 8 can now be inserted without problems through the bore 6, and subsequently through the cutout 22, with the lugs 23 and the bore 7. Because of the manner in which the lugs 23 are arranged, the lugs 23 permit insertion of the threaded portion of the screw 8, but the screw 8 can now no longer be pulled back, because the resilient lugs 23 engage the thread of the tightening screw 8 at an acute angle and in a positively engaging manner. The cross-sectional shape of the shaft of the tightening screw 8 secures the tightening screw 8 against rotation. The nut 9 is now screwed onto the thread of the tightening screw 8, which projects out of the side wall 3, and the nut 9 is tightened by means of a suitable tool without requiring another means for holding the screw. All of these assembly steps can be carried out successively using only one hand.

A second embodiment of an auxiliary piece 16 according to the present invention is shown in FIGS. 10-13. In this embodiment, the auxiliary piece 16 is kept U-shaped and has two side parts 26, 27 and a web 28 connecting the side parts 26, 27, wherein the web 28 has a greater width than the side parts 26, 27, and the portions of the web 28 which project beyond the side parts 26, 27 are bent downwardly, as can be seen in FIGS. 11, 12.

The side parts 26, 27 of the U-shaped auxiliary piece 16 are constructed in the manner described in connection with FIGS. 2-4. The recess 22, with the lugs 23, is provided in one side part 27. The other side part 26 has a bore 25 which is in alignment with the side part 27. A pair of tongues 24 each are punched into the side parts 26, 27. The tongues 24 are bent inwardly. The side parts 26, 27 are slightly higher than the side walls 3, 4 of the coupling member 1, so that the side parts 26, 27 project upwardly out of the coupling member if the auxiliary piece is mounted correctly, as shown in FIG. 15. The upwardly projecting sections 29 are bent slightly outwardly and, consequently, form a wedge-shaped insertion slot for the portion 13 of the shaft journal 12.

The front view of FIG. 15 shows the manner in which the auxiliary piece 16 is mounted on the coupling member 1. When this auxiliary piece is used, the connection can be assembled using only one hand, in the same manner as described above in connection with the first embodiment. In addition, the upwardly projecting sections 29, which define a wedge-shaped insertion slot, facilitate swinging of the portion 13 of the shaft journal 12 into the coupling member.

A third embodiment of the auxiliary piece 16 according to the present invention is shown in FIGS. 6–9. The auxiliary member 16 is again U-shaped and has side parts 26, 27 and a web 28 connecting the side parts. The upper contour or edge 30 of one side part 27 has an inwardly projecting bent lug 32. The other side part 26 also has, at the upper edge thereof, a lug 32 which is bent inwardly and to which are connected the part 17 with the tongues 24, the cutout 22, and the lugs 23, wherein the part 17 is constructed in the same manner as the part 17 of the first embodiment. Thus, when the auxiliary piece 16 is assembled correctly, the piece 16 surrounds the coupling member 1 from the outside, as can be seen in FIG. 14. The individual components forming the connection device are successively assembled using only one hand, as described above in connection with the first and second embodiments of the invention.

As compared to the second embodiment, the first and third embodiments have the advantage that the shaft journal 12 or its portion 13 is received directly and immediately by the U-shaped cross section of the coupling member 1 and rests against the side walls and the web of the coupling member 1, while the auxiliary piece 16 remains between the shaft journal 12 and the coupling member 1 in the second embodiment, as can be seen in FIG. 15 of the drawing.

It should be understood that the preferred embodiments and examples described are for illustrative purposes only and are not to be construed as limiting the scope of the present invention which is properly delineated only in the appended claims.

We claim:

1. A device for connecting a steering column of a motor vehicle with a shaft journal of a steering mechanism, comprising a U-shaped coupling member having side walls and a web connecting the side walls, the coupling member having a transverse axis, the coupling member being connected to the steering column so as to be swingable about the transverse axis, each side wall defining a bore, the bores being arranged in alignment with each other, a tightening screw being inserted in the bores of the side walls, the tightening screw having means for securing the tightening screw against rotation, and a nut for securing the tightening screw, an auxiliary piece bearing against at least one of the side walls of the coupling member, the auxiliary piece defining a cutout essentially in alignment with the bores of the side walls, the cutout having a rim, lugs projecting into the bore of the side wall being formed at the rim of the cutout, the auxiliary piece further comprising tongues on each side of the cutout. The tongues projecting toward a center plane of the U-shaped coupling member and toward the web of the U-shaped coupling member, the tongues having front edges, the front edges bearing against the shaft journal so as to prevent removal of the shaft journal from the U-shaped coupling member.

2. The device according to claim 1, wherein the auxiliary piece has an outer contour facing away from the web of the coupling member, at least one lug member connected to the outer contour of the auxiliary piece, a side part connected to the lug member, the auxiliary piece and the side part extending approximately parallel to each other, such that the auxiliary piece, the web member, and the side part form a U-shaped stirrup, the side wall of the coupling member having a wall thickness, wherein the auxiliary piece and the side part are spaced from each other by a distance which corresponds approximately to the wall thickness of the side wall of the coupling member, and wherein the side wall of the coupling member is located between the auxiliary piece and the side part.

3. The device according to claim 2, wherein an additional side part is attached to the U-shaped stirrup, the additional side part extending around another side wall of the coupling member, the another side wall having an upper edge, the additional side part engaging over the upper edge.

4. The device according to claim 3, wherein the side part of the U-shaped stirrup and the additional side part extend around an outer surface of the coupling member.

5. The device according to claim 1, wherein the auxiliary piece is U-shaped and comprises side parts placed against inner surfaces of the side walls of the coupling member, the side parts defining cutouts which are in alignment with the bores of the side walls of the coupling member.

6. The device according to claim 5, wherein both side parts of the U-shaped auxiliary piece are provided with a pair of tongues on both sides of the cutouts.

7. The device according to claim 1, wherein the bore in the side wall of the coupling member has an inner surface, and wherein at least one of the lugs at the rim of the cutout of the auxiliary piece includes an acute angle with the inner surface of the bore of the side wall of the coupling member.

8. The device according to claim 1, wherein the auxiliary piece with the cutout provided with lugs projecting into the bore of the side wall rests against the same side wall of the coupling member as the nut for the tightening screw.

9. The device according to claim 5, wherein the U-shaped auxiliary piece comprises a web piece connecting the side parts, the web piece having a greater width than the side parts and defining a portion projecting beyond the side parts, wherein the projecting portion is bent downwardly.

10. The device according to claim 5, wherein the side parts of the U-shaped auxiliary piece project upwardly beyond the side walls of the coupling member and define projecting portions, the projecting portions being bent outwardly and each including an acute angle with a center plane of the coupling member.

* * * * *